United States Patent
Takamuku et al.

(10) Patent No.: US 12,531,252 B2
(45) Date of Patent: Jan. 20, 2026

(54) METHOD OF RECOVERING MATERIALS FORMING FUEL CELL STACK

(71) Applicant: Robert Bosch GmbH, Stuttgart (DE)

(72) Inventors: Shogo Takamuku, Tokyo (JP); Claudio Baldizzone, Renningen (DE); Katsuhiko Oshikawa, Tokyo (JP)

(73) Assignee: Robert Bosch GmbH, Stuttgart (DE)

( * ) Notice: Subject to any disclaimer, the term of this patent is extended or adjusted under 35 U.S.C. 154(b) by 1010 days.

(21) Appl. No.: 17/261,132

(22) PCT Filed: Jun. 4, 2019

(86) PCT No.: PCT/IB2019/054606
§ 371 (c)(1),
(2) Date: Jan. 18, 2021

(87) PCT Pub. No.: WO2020/016671
PCT Pub. Date: Jan. 23, 2020

(65) Prior Publication Data
US 2021/0296658 A1 Sep. 23, 2021

(30) Foreign Application Priority Data
Jul. 17, 2018 (JP) .................................. 2018-133921

(51) Int. Cl.
*H01M 8/008* (2016.01)
*B09B 3/40* (2022.01)
(Continued)

(52) U.S. Cl.
CPC ............... *H01M 8/008* (2013.01); *B09B 3/40* (2022.01); *B09B 3/70* (2022.01); *C22B 7/003* (2013.01); *C22B 7/006* (2013.01); *C22B 11/046* (2013.01)

(58) Field of Classification Search
CPC B09B 3/40; B09B 3/80; C22B 11/046; C22B 7/00; C22B 7/003; C22B 7/006; H01M 8/008; Y02E 60/50
(Continued)

(56) References Cited

U.S. PATENT DOCUMENTS 9,267,212 B2 * 2/2016 Twardowski ......... C07C 51/347
2006/0147791 A1 7/2006 Debe et al.
(Continued)

FOREIGN PATENT DOCUMENTS

JP 2684171 B2 12/1997
JP 2004171921 A 6/2004
(Continued)

OTHER PUBLICATIONS

International Search Report and Written Opinion for Application No. PCT/IB2019/054606 dated Aug. 22, 2019 (8 pages).

*Primary Examiner* — Jie Yang
(74) *Attorney, Agent, or Firm* — Michael Best & Friedrich LLP (57) ABSTRACT

To recover materials forming a fuel cell stack by an easy method.
Provided is a method of recovering, from a fuel cell stack having a stack structure including a plurality of fuel cells stacked, materials forming the fuel cell stack, the fuel cells each including a membrane electrode assembly and two separators holding the membrane electrode assembly therebetween, the separators each being provided with a gas flow channel configured to supply a raw material gas to the membrane electrode assembly, the method including: a first step of supplying a solvent or a solvent and a reagent to the fuel cell stack through the gas flow channel, collecting the solvent which contains a material, and recovering the material from the collected solvent; and a second step of subjecting the fuel cell stack after the first step to a heat
(Continued)

treatment to obtain a molten liquid or gas and recovering a material from the molten liquid or gas, the materials recovered including materials forming the membrane electrode assembly and the separators.

9 Claims, 4 Drawing Sheets

(51) Int. Cl.
    *B09B 3/70*     (2022.01)
    *C22B 7/00*     (2006.01)
    *C22B 11/00*     (2006.01)

(58) Field of Classification Search
    USPC .......................................................... 75/403
    See application file for complete search history.

(56) References Cited

U.S. PATENT DOCUMENTS

| | | | |
|---|---|---|---|
| 2006/0275652 A1 | 12/2006 | Hageluken et al. | |
| 2016/0049691 A1* | 2/2016 | Suzuki ................ | H01M 10/052 |
| | | | 429/188 |

FOREIGN PATENT DOCUMENTS

| | | | |
|---|---|---|---|
| JP | 2005251728 | A | 9/2005 |
| JP | 2008027700 | A | 2/2008 |
| JP | 2008027835 | A | 2/2008 |
| JP | 2009176731 | A | 8/2009 |
| JP | 2010055879 | A | 3/2010 |
| JP | 6172246 | B2 | 3/2013 |

\* cited by examiner

METHOD OF RECOVERING MATERIALS FORMING FUEL CELL STACK

BACKGROUND OF THE INVENTION

The present invention relates to a method of recovering materials forming a fuel cell stack. In particular, the present invention relates to a method of recovering materials forming a solid polymer electrolyte type fuel cell stack.

It has traditionally been considered important for further diffusion of the use of fuel cells to recover a material forming a fuel cell, such as a catalyst, to reuse the material. In a known method of recovering a catalyst from a fuel cell, a membrane electrode assembly is burned in a furnace and a precious metal is recovered from the burned residue, and in another known method, a catalyst layer is dissolved in an acid solution, such as aqua regia, and a precious metal is recovered from the resulting solution (see, for example, Japanese Patent No. 2684171 and Japanese Patent No. 5172246).

In addition, in a known method of recovering a proton conductive polymer from a fuel cell, a proton conductive polymer contained in a membrane electrode assembly is dissolved in a solvent, such as an alcohol solution, and the proton conductive polymer is recovered from the resulting solution (see, for example, JP-A-2004-171921).

SUMMARY OF THE INVENTION

However, the methods disclosed in Japanese Patent No. 2684171, Japanese Patent No. 5172246, and JP-A-2004-171921 each require a step of disassembling a fuel cell, and therefore need an additional step and facility for disassembly. Thus, it has been difficult to recover materials from a fuel cell in an efficient manner.

Furthermore, in the methods disclosed in Japanese Patent No. 2684171, Japanese Patent No. 5172246, and JP-A-2004-171921, the recovery target is only a precious metal or a proton conductive polymer which is an expensive, useful material. That is, other materials forming a fuel cell are not recovery targets and will be subjected to incineration or landfill disposal as they are. Thus, disposal of fuel cells has placed a burden on the environment due to, for example, generation of carbon dioxide in incineration. In particular, a separator, which accounts for a large portion of a fuel cell mass, is required to be recovered and reused.

One reason why the attention has not been focused on the recovery of materials other than precious metals and proton conductive polymers in the related art is the following: since a fuel cell is composed of a large variety of materials, a cumbersome process is required for separating and recovering the materials, and a large scale of recovery facility provided with special exhaust equipment and the like is required for implementing the process. That is, in order to further diffuse the use of fuel cells, a method is needed in which materials, including not only expensive useful materials but also other materials forming a fuel cell, can be recovered by an easy process using a simple facility.

An object of the present invention is to recover materials forming a fuel cell stack by an easy method.

The method according to the present invention is a method of recovering, from a fuel cell stack having a stack structure including a plurality of fuel cells stacked, materials forming the fuel cell stack, the fuel cells each including a membrane electrode assembly and two separators holding the membrane electrode assembly therebetween, the separators each being provided with a gas flow channel to configured to supply a raw material gas to the membrane electrode assembly, the method including:

a first step of supplying a solvent or a solvent and a reagent to the fuel cell stack through the gas flow channel, collecting the solvent which contains a material, and recovering the material from the collected solvent;

a second step of subjecting the fuel cell stack after the first step to a heat treatment to obtain a molten liquid or a gas and recovering a material from the molten liquid or gas, the materials recovered including materials forming the membrane electrode assembly and the separators.

Advantageous Effects of Invention

According to the present invention, materials forming a fuel cell stack can be recovered by an easy method.

DETAILED DESCRIPTION

An embodiment of the recovery method of the present invention will be described below with reference to the drawings. The configuration described below is one example (typical example) as an embodiment of the present invention, and the present invention is not limited to the configuration described below.

In addition, the same or similar explanation is hereinafter appropriately simplified or omitted. The drawings are schematic and it should be noted that the ratios and the like of the sizes of parts are different from actual ones. In addition, of course, there are contained some parts for each of which some size relationships or ratios are different between multiple drawings.

Embodiment 1

A method of recovering materials forming a fuel cell stack according to an embodiment 1 will be described below.

The method according to the embodiment 1 of the present invention is a method of recovering, from a fuel cell stack having a stack structure including a plurality of fuel cells stacked, multiple materials forming the fuel cell stack without disassembling the fuel cell stack.

First, the fuel cell stack used in the method according to the embodiment 1 of the present invention is described. In the fuel cell stack, plural fuel cells are stacked.

Figure 1:
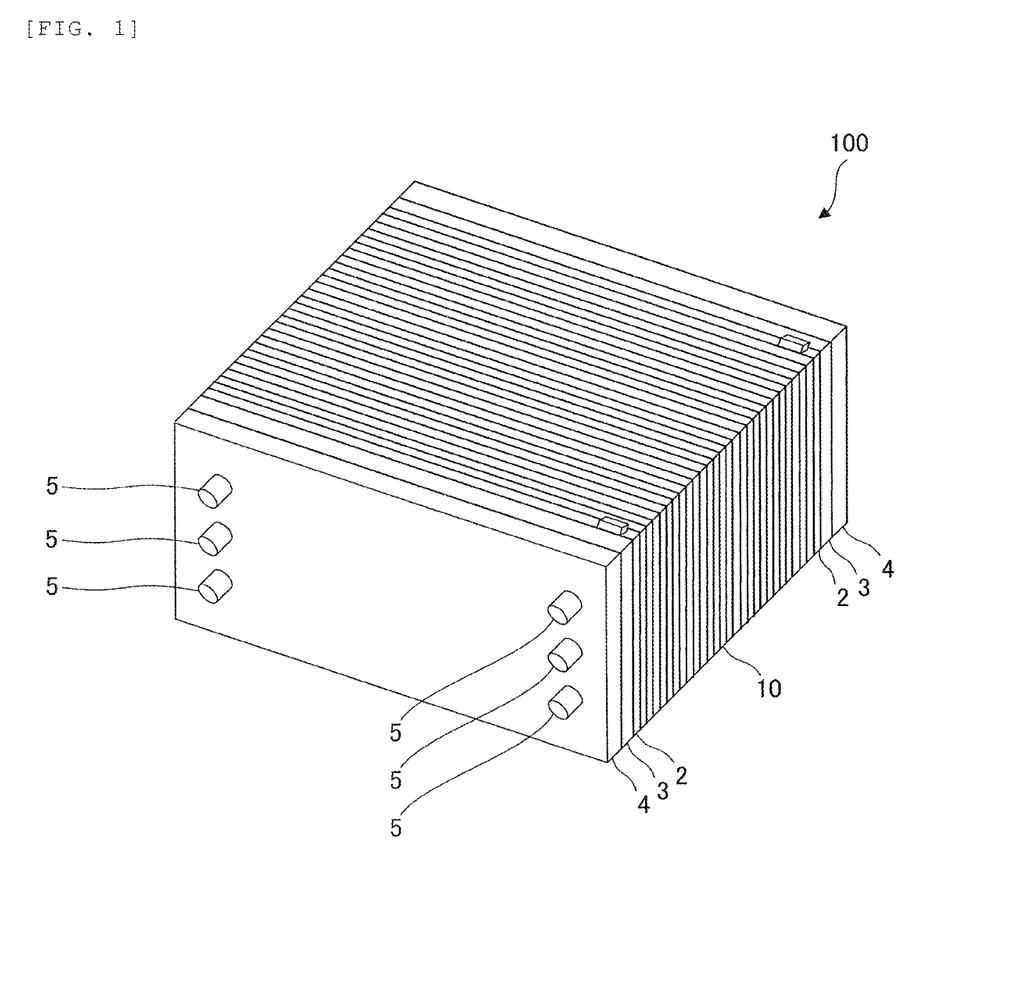
FIG. 1 is a perspective view illustrating an example of a configuration of a fuel cell stack.

FIG. 1 is a perspective view illustrating an example of a configuration of a fuel cell stack.

As shown in FIG. 1, a fuel cell stack 100 includes a plurality of fuel cells 10, two current collectors 2, two insulating plates 3, and two end plates 4. The fuel cells 10 are each a solid polymer type fuel cell. The structure of the fuel cell 10 will be described later with reference to FIG. 2.

The current collectors 2 are each provided outside the plurality of stacked fuel cells 10. The current collectors 2 are formed of a gas impermeable conductive material. An example of a gas impermeable conductive material is dense carbon.

The insulating plates 3 are provided outside the current collectors 2, respectively. The insulating plates 3 are each formed of an insulating material. An example of an insulating material is rubber.

The end plates 4 are disposed outside the insulating plates 3, respectively. The end plates 4 are formed of a rigid metal material. An example of a rigid metal material is stainless steel.

The current collector 2, the insulating plate 3, and the end plate 4 that are disposed on one end side of the fuel cell stack 100 each have six apertures. The six apertures are a cooling water inlet aperture, a cooling water outlet aperture, an anode gas inlet aperture, an anode gas outlet aperture, a cathode gas inlet aperture, and a cathode gas outlet aperture. Then, the end plate 4 is provided with flow channel connectors 5 that have a structure to connect gas flow channels or cooling water flow channels described later and that are continuously connected to six apertures. The fuel cell stack 100 performs power generation by an electrochemical reaction of a combustion gas, such as hydrogen, supplied to the anode gas inlet aperture and an oxygen gas, such as oxygen, supplied to the cathode gas inlet aperture.

Note that the fuel cell stack 100 is held in a state where a prescribed pressure is applied in the stacking direction. In FIG. 1, the configuration to apply the pressure to the fuel cell stack 100 is not shown.

Figure 2:
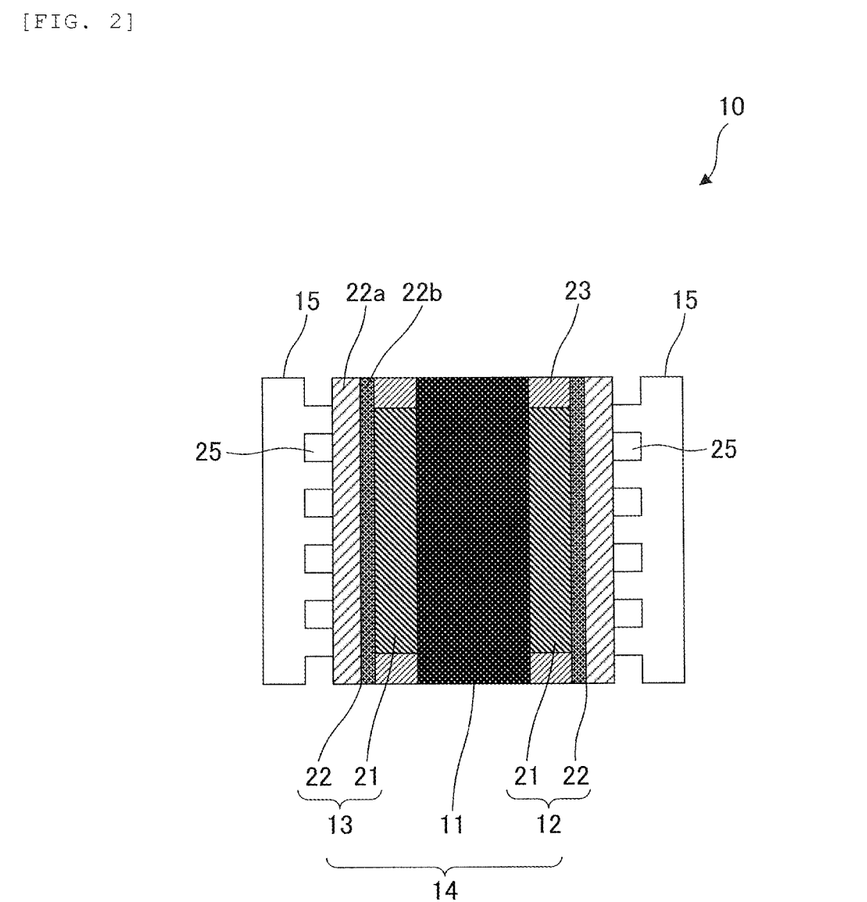
FIG. 2 is a cross section illustrating an example of a configuration of a fuel cell.

FIG. 2 is a cross section illustrating an example of a configuration of a fuel cell.

As shown in FIG. 2, the fuel cell 10 includes two separators 15 and a membrane electrode assembly 14 provided between the two separators 15.

The membrane electrode assembly 14 is formed by bonding an anode 12 and a cathode 13 on the two faces of the electrolyte membrane 11, respectively, to integrate them. The anode 12 and the cathode 13 each include a catalyst layer 21, a gas diffusion layer 22, and a sealing portion 23. The anode 12 and the cathode 13 are each provided with a separator 15 on the outside thereof. The separators 15 hold the anode 12, the electrolyte membrane 11, and the cathode 13 therebetween. Gas flow channels 25 are formed in the separators 15.

The electrolyte membrane 11 is a proton conductive polymer formed of a solid polymer material, for example, a fluororesin, and has good electric conductivity in the wet state. Examples of materials of the electrolyte membrane 11 include perfluoroslufonic acid polymers, and aromatic polymers and aliphatic polymers that have an acidic functional group, such as a sulfonic acid group, a phosphoric acid group, and a carboxylic acid group. In the method according to the embodiment 1 of the present invention, the recovery target is preferably a perfluorosulfonic acid polymer from the viewpoint of being in common use.

The catalyst layer 21 contains a catalyst for a reaction of hydrogen gas or oxygen as a raw material gas, a carrier supporting a catalyst, and a solid polymer electrolyte (an electrolyte for a catalyst layer is herein referred to as an ionomer). In the catalyst layer 21, the catalyst in the form of particles is supported on the carrier, and the carrier and the catalyst are coated with the ionomer.

The catalyst has catalytic activity for a reaction of hydrogen gas or oxygen gas as a raw material gas. The catalyst is not limited as long as it has catalytic activity for hydrogen gas or oxygen gas, and examples include metals, such as platinum (Pt), gold (Au), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga), and aluminum (Al), and mixtures and alloys of the metals.

As the ionomer used in the catalyst layers 21, the same material as for the electrolyte membrane 11 may be used. Examples thereof include ion exchange polymers, for example, perfluoro sulfonic acid polymers and aromatic polymers having an acidic functional group, such as a sulfonic acid group, a phosphoric acid group, and a carboxylic acid group. The ionomer for use in the catalyst layers 21 may be of the same type as or a different type from the electrolyte membrane 11.

The gas diffusion layer 22 diffuses hydrogen gas or oxygen gas as a raw material gas supplied to the anode 12 or the cathode 13 over the electrode. The gas diffusion layer 22 includes a gas diffusion substrate layer 22a and a microporous layer 22b that is laminated on the gas diffusion substrate layer 22a and that is bonded to the catalyst layer 21.

Although the material forming the gas diffusion substrate layer 22a is not limited as long as it has a low electric resistance and can collect electric current, one that mainly contains a conductive inorganic substance is generally used. Examples of conductive inorganic substances include a burned product of polyacrylonitrile, a burned product of pitch, carbon materials, such as graphite and expanded graphite, stainless steel, molybdenum, and titanium. From the viewpoint of gas permeability, an inorganic conductive fiber, in particular, a carbon fiber is preferred. Examples of carbon fibers include carbon paper and carbon cloth.

The material forming the microporous layer 22b is not limited, as long as it allows supply of a fuel gas or an oxidant gas to the catalyst layer 21 on the side of the anode 12 or the cathode 13, has a water repellant effect to remove produced water, and has conductivity. In general, the microporous layer 22b is formed of carbon particles and a fibrous polytetrafluoroethylene (PTFE) which is a fluororesin. Note that the fluororesin may be, besides PTFE, for example, polyvinylidene difluoride (PVDF), polyvinyl fluoride (PVF), or polychlorotrifluoroethylene (PCTFE). In the method according to the embodiment 1 of the present invention, the fluororesin as a recovery target is preferably PTFE from the viewpoint of being in common use.

The sealing portion 23 is provided on the catalyst layer 21. The sealing portion 23 is formed, for example, by placing one that is previously processed to have a prescribed thickness and shape (a sheet or O-ring shape), or by applying a flowable sealant or the like in a prescribed thickness and shape and curing the sealant. The sealing portion 23 includes a leak-proof gas seal which is used for preventing leakage of a fuel gas or the like and a reinforcing seal which is used for mechanically reinforcing the electrolyte membrane 11 and/or for sealing other members.

As the gas seal, a soft rubber seal or the like is generally used. More specifically, the gas seal is formed of, for example, a fluororubber, a silicone rubber, an olefin rubber (ethylene-propylene rubber, acrylic rubber, butyl rubber, halogenated butyl rubber, etc.), or a diene rubber (isoprene rubber, butadiene rubber, nitrile rubber, chloroprene rubber, etc.).

The reinforcing seal is formed of, for example, polyethylene naphthalate, polyethylene terephthalate, polyphenylene sulfide, polyethersulfone, polyetheretherketone, polyimide, polypropylene, polyimide, or polyvinilydene difluoride.

The separator 15 is a member that forms the wall surface of the gas flow channel 25 in which a raw material gas flows, and a groove for forming the gas flow channel 25 is formed on the surface thereof. The gas flow channel 25, which is a channel for gas flow, is formed between the separator 15, with a groove formed on the surface thereof, and the anode 12 or the cathode 13. Then, in the fuel cell stack 100, the separator 15 has, on the face opposite to the face in direct contact with the anode 12 or the cathode 13, a cooling water flow channel (not shown) in which cooling water for cooling the fuel cell stack 100 flows.

The separator 15 further has a plurality of apertures at positions corresponding to those of the other separator 15 near the periphery thereof. Specifically, apertures are provided at positions corresponding to the cooling water inlet aperture, the cooling water outlet aperture, the anode gas inlet aperture, the anode gas outlet aperture, the cathode gas inlet aperture, and the cathode gas outlet aperture in the fuel cell stack 100 as described above. When the separators 15 are laminated with the membrane electrode assembly 14 to assemble the fuel cell stack 100, the respective apertures provided at the corresponding positions of the separators 15 overlap with each other to form the gas flow channel 25 and the cooling water flow channel passing through the interior of the fuel cell stack 100 in the stacking direction of the separators 15.

The separators 15 are formed of a conductive metal material, such as stainless steel, titanium, or a titanium alloy, since such a material has high strength, light weight, and high corrosion resistance. A conductive coating is generally formed on the surface of the metal material. The conductive coating is formed of, for example, an alloy containing gold, platinum, palladium, or the like.

Method of Recovering Multiple Materials Forming Fuel Cell Stack

As the method according to the embodiment 1 of the present invention, a method of recovering multiple materials forming the fuel cell stack 100 will be explained.

According to the embodiment 1 of the present invention, the method includes the steps of: supplying, as needed, to the gas flow channel 25 formed in the fuel cell stack 100, a reagent that chemically reacts with materials and a solvent for dissolving the materials to be recovered; recovering the materials from the solvent solution which contains the materials; and subjecting the fuel cell stack 100 after the former step to a heat treatment to convert materials into a molten or gaseous form; and recovering the materials from the molten liquid or gas.

The method according to the embodiment 1 of the present invention requires no step of disassembling the fuel cell stack 100 since the gas flow channel 25 which has already been formed in the fuel cell stack 100 is used to recover the materials. Thus, the materials can be recovered by an easy process using a simple facility. In the recovery facility, the method according to the embodiment 1 of the present invention allows the use of an efficient recovery method, such as an inline process, which is difficult to use in the existing recovery method.

In addition, a proton conductive polymer is recovered through the step in which the gas flow channel is used. Thus, in the step of subjecting the fuel cell stack 100 to a heat treatment, the heat treatment is performed on the fuel cell stack 100 from which the proton conductive polymer has already been recovered. That is, by combining the above two steps, the method according to the embodiment 1 of the present invention can avoid generation of hydrogen fluoride from the proton conductive polymer due to a heat treatment. Accordingly, no special exhaust equipment or the like is required, leading to simplification of the facility for recovery.

Furthermore, the combination of the two steps makes it possible to recover not only precious metals and proton conductive polymers but also multiple other materials forming the fuel cell stack 100. For example, organic compounds, fluororesins, carbon, metals other than precious metals, and other materials can be recovered. Thus, the method according to the embodiment 1 of the present invention can reduce the emission of carbon dioxide and other gases, which would have otherwise been generated by incineration of multiple other materials, and thus reduce the environmental load. Furthermore, the environmental load and the cost for disposal can be reduced owing to reduction in the amount to be subjected to landfill.

Figure 3:
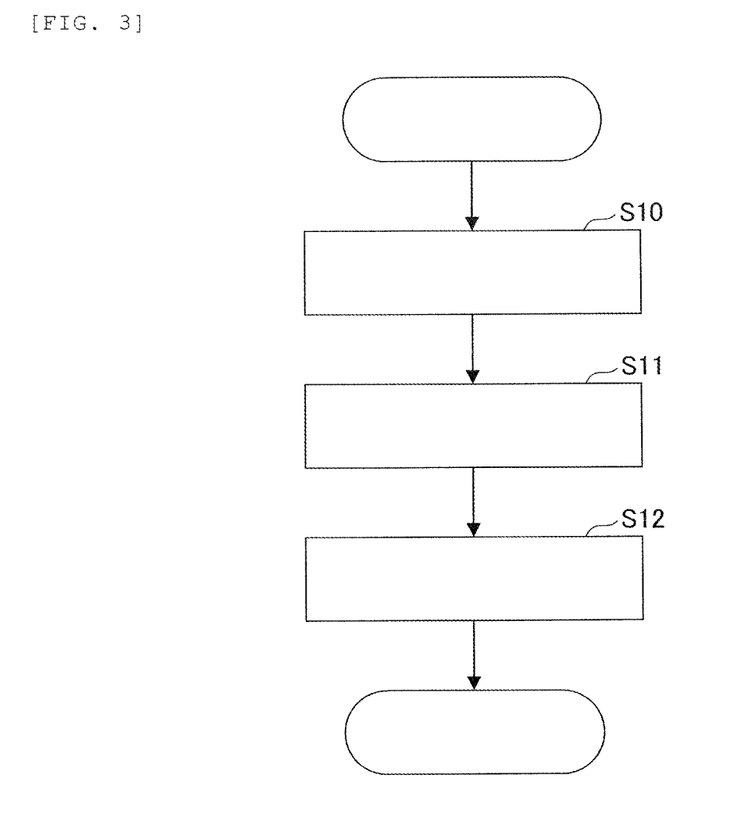
FIG. 3 is a flow chart illustrating a method of recovering materials forming a fuel cell stack according to an embodiment 1 of the present invention.

FIG. 3 is a flow chart showing the method of recovering materials forming a fuel cell stack according to the embodiment 1 of the present invention.

As shown in FIG. 3, the recovery method according to the embodiment 1 of the present invention includes Step S10, Step S11, and Step S12. The steps will be described below.

Step of Providing Fuel Cell Stack

Step S10 is a step of providing the fuel cell stack 100 to be subjected to the recovery.

The fuel cell stack 100 provided in Step S10 is a fuel cell stack in a state where a gas supplier, a gas discharger, a cooling water supplier, a cooling medium discharger, and the like which are required for power generation have been removed. Note that a prescribed pressure is applied in the stacking direction to keep the sealing property in the gas flow channel 25 in the fuel cell stack 100.

Step of Recovering Precious Metal, Proton Conductive Polymer, and Organic Compound Using Gas Flow Channel Step S11 is a step of recovering a precious metal, a proton conductive polymer, and an organic compound from the fuel cell stack 100 using the gas flow channel 25 without disassembling the fuel cell stack 100.

In Step S11, a solvent or a solvent and a reagent are supplied to the gas flow channel 25 of the fuel cell stack 100, whereby the target materials are recovered.

The solvent refers to a solvent for dissolving and recovering the target materials, a product of the materials and the reagent, and the like. The reagent comprehensively refers to a compound that induces a chemical reaction. Examples of reagents include known oxidants, neutralizing agents, reductants, and initiators.

Specifically, after Step S10, a supplying unit for the solvent or the reagent and the gas flow channel 25 of the fuel cell stack 100 are connected. Then, the solvent or the reagent for recovering the materials is supplied to the gas flow channel 25. After the supplying, the target materials are recovered from the solvent containing the target materials. Note that the materials may be recovered after the solvent or the reagent is circulated in the gas flow channel 25 of the fuel cell stack 100. An explanation will be made below with reference to FIG. 4.

Figure 4:
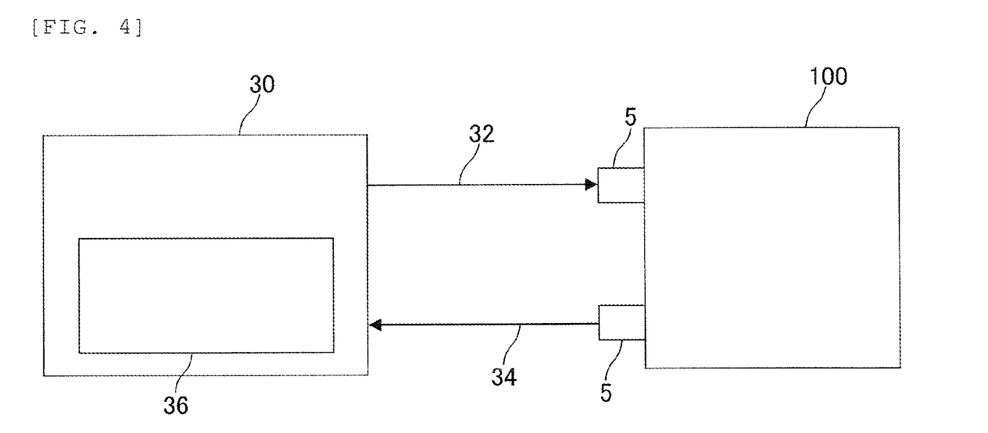
FIG. 4 is a diagram for explaining a connection of a solvent supply unit and a gas flow channel of a fuel cell stack according to the embodiment 1 of the present invention.

FIG. 4 is a diagram for explaining connection of a solvent supply unit to a gas flow channel in a fuel cell according to the embodiment 1 of the present invention.

A solvent supply unit 30 is a known solution supply pump or gas supply pump. The solvent supply unit 30 includes a solvent storage tank 36, a solvent ejection pipe 32, and a solvent collection pipe 34. When the solvent supply unit 30 is connected to the gas supply channel in the fuel cell, one of the flow channel connectors 5 provided in the end plate 4 of the fuel cell stack 100 is connected to the ejection pipe 32, and another of the flow channel connectors 5 provided in the end plate 4 is connected to the recovery pipe 34.

Then, a prescribed amount of the solvent is supplied from the solvent storage tank 36 through the ejection pipe 32 to the fuel cell stack 100. The solvent supply unit 30 can circulate the solvent between the flow channel in the solvent supply unit 30 and the gas flow channel 25 in the fuel cell stack 100.

Note that, although an example where a solvent is used is described above, the reagent and a buffer gas described later may also be supplied to the gas flow channel 25 of the fuel cell stack 100 by the same configuration as for the solvent supply unit 30.

The solvent or the solvent and the reagent, which are supplied to the gas flow channel 25 of the fuel cell stack 100, may be brought into contact with the members constituting the fuel cell stack 100, such as the catalyst layers 21, the gas diffusion layers 22, the electrolyte membrane 11, and the separators 15. The solvent containing the target materials is collected into a storage tank 36 for the solvent. The target materials are dissolved in the collected solvent, and the materials may be recovered through purification by a known method. Examples of materials to be recovered include a precious metal, a proton conductive polymer, and an organic compound. An example of recovery of a precious metal, a proton conductive polymer, and an organic compound will be described below.

Example of Recovery of Precious Metal

First, an example of a step of recovering a precious metal will be explained.

The precious metal is recovered from the catalyst layer 21, the conductive coating of the separator 15, and the like in the membrane electrode assembly 14.

Examples of precious metals to be recovered include platinum, gold, silver, palladium, iridium, rhodium, ruthenium, and osmium.

For recovering a precious metal, an oxidant and a reductant as reagents and an electrolytic solution as a solvent are supplied to the gas flow channel 25 of the fuel cell stack 100.

As the oxidant, any known oxidant may be used as long as it oxidizes the precious metal. Examples include oxide, ozone, hydrogen peroxide, chloric acid, perchloric acid, alkaline permanganate, alkali metal percarbonate, alkali metal sulfate, and a mixture thereof. Among them, ozone is preferably used, since ozone has a high reactivity with a precious metal and has a small environmental load. Note that when ozone is used as an oxidant, a known ozone generator may be used to supply ozone to the gas flow channel 25 of the fuel cell stack 100.

The reductant is used on a reaction product produced by bringing the oxidant into contact with a precious metal. A known reductant may be used. For example, hydrogen sulfide, sulfur dioxide, sulfur trioxide, carbon monoxide, hydrogen, methanol, ethanol, and mixtures thereof may be used. Among them, from the viewpoint of reactivity, hydrogen, carbon monoxide, and a mixed gas thereof are preferred.

An electrolytic solution is an electrically conductive solution in which an electrolyte is dissolved in a polar solvent. It is a diluted acidic, neutral, or basic solution that is pH-adjustable, and is used for dissolving metal ions produced by the reagent. As the electrolytic solution, a known electrolytic solution may be used. The composition of the electrolytic solution may be appropriately selected depending on the type of the precious metal to be recovered. Examples of acidic solutions include hydrochloric acid, perchloric acid, sulfuric acid, and nitric acid. Examples of basic solutions include sodium hydroxide and potassium hydroxide. Among them, from the viewpoint of handleability and reactivity, 0.1 M hydrochloric acid or 0.1 M sodium hydroxide is preferred.

From the viewpoint of forming a stable complex with a precious metal ion, the electrolytic solution preferably contains a complexing agent. Examples of complexing agents include an alkali metal chloride, an alkali metal bromide, and an alkali metal iodide. More specific examples include sodium chloride, potassium chloride, sodium bromide, potassium bromide, sodium iodide, and potassium iodide. The complexing agent may be added to the electrolytic solution until the saturated concentration is reached.

The steps of recovering a precious metal will be specifically described.

First, an oxidant and an electrolytic solution are supplied to the gas flow channel 25 of the fuel cell stack 100. Thus, the precious metal is oxidized to induce dissolution of the precious metal. The dissolution is temporary, and after an oxide surface layer is formed on the surface of the precious metal, the dissolution of the precious metal stops. The dissolved precious metal is recovered with the electrolytic solution.

Next, a buffer gas (for example, nitrogen) is supplied to the gas flow channel 25 of the fuel cell stack 100 to discharge the oxidant in the fuel cell stack 100. Thus, the contact of the oxidant with a reductant in the fuel cell stack 100 can be prevented.

Next, a reductant and the electrolytic solution are supplied to the gas flow channel 25 of the fuel cell stack 100. Thus, the oxide surface layer on the precious metal is removed.

Next, a buffer gas (for example, nitrogen) is supplied to the gas flow channel 25 of the fuel cell stack 100 to discharge the reductant in the fuel cell stack 100.

The above steps are repeated, whereby the precious metal can be dissolved and recovered.

Platinum as a precious metal may be recovered, for example, using ozone as the oxidant, a mixed gas of hydrogen and carbon monoxide as the reductant, and dilute hydrochloric acid containing sodium chloride as the electrolytic solution. Gold as a precious metal may be recovered, for example, using ozone as the oxidant, sulfur dioxide as the reductant, and dilute hydrochloric acid as the electrolytic solution.

Note that the method according to the embodiment 1 of the present invention can selectively recover a precious metal to be recovered by combining an oxidant, a reductant, and an electrolytic solution. For example, when ozone as an oxidant, hydrogen as a reductant, and 0.1 M sodium hydroxide containing sodium chloride as an electrolytic solution are combined in the catalyst layer 21 composed of platinum and ruthenium as catalysts, only ruthenium can be selectively dissolved in the electrolytic solution and thus recovered.

Since the precious metal which was contained in the catalyst layer 21, the conductive coating of the separators 15, and the like is dissolved in the collected electrolytic solution, the collected electrolytic solution is subjected to a general purification step of the precious metal. Then, the precious metal in the electrolytic solution is recovered in the purification step, and is used as an industrial precious metal raw material, for example, is reused as a catalyst in the catalyst layer 21.

The gas discharged from the step is, for example, a small amount of carbon dioxide, chlorine, oxygen, and hydrogen, and no special facility is required for disposal. Also, no facility is required for, for example, immersing members composing a fuel cell. Furthermore, there is no possibility to lose the precious metal to be recovered due to a disassembly step, such as cutting, of the membrane electrode assembly 14. Thus, it is possible to recover the precious metal by an easy process using a simple facility without disassembling the fuel cell stack 100. The same applies to the following examples.

Example of Recovery of Proton Conductive Polymer

Next, an example of a step of recovering a proton conductive polymer will be described.

The proton conductive polymer is recovered from the electrolyte membrane 11, the catalyst layers 21, and the like in the membrane electrode assembly 14.

From the viewpoint of being in common use, the proton conductive polymer to be recovered is preferably a perfluorosulfonic acid polymer.

In order to recover a proton conductive polymer, an alcohol solution as a solvent is supplied to the gas flow channel 25.

Examples of alcohols in the alcohol solution include methanol, ethanol, 1-propanol, 2-propanol, 1-butanol, 2-butanol, isobutyl alcohol, tert-butyl alcohol, pentanol, and mixtures thereof. Among them, from the viewpoint of solubility, isopropanol is preferred. Note that the alcohol solution may contain water. The alcohol solution may contain, for example, 5 to 95% by weight of water.

Specifically, as shown in FIG. 4, the alcohol solution is supplied to the gas flow channel 25 using a supply unit 30.

The amount of the alcohol solution supplied to the gas flow channel 25 may be an amount to dissolve the proton conductive polymer. The temperature of the alcohol solution supplied may be a temperature at which the proton conductive polymer can be dissolved. If the temperature for dissolution exceeds the boiling point at normal pressure of the solvent, the proton conductive polymer may be dissolved under pressure. The temperature of the alcohol solution supplied is not limited, but is generally in the range of 25° C. which is a normal temperature to 100° C. The alcohol solution is preferably circulated in the gas flow channel 25. The time of circulation of the alcohol in the gas flow channel 25 may be a time required for completely dissolving the proton conductive polymer, and depending on the circulated alcohol solution, the time is generally approximately from 5 minutes to 1 day. Note that, when the alcohol solution is supplied, the fuel cell stack 100 may be irradiated with ultrasonic waves for promoting the dissolution.

The supplied alcohol solution, which contains the proton conductive polymer dissolved from the electrolyte membrane 11 and the catalyst layers 21, may be supplied to a known process for purification and recovery of the proton conductive polymer.

Example of Recovery of Organic Compound

Next, an example of a step of recovering an organic compound will be described.

The organic compound is recovered from the electrolyte membrane 11, the microporous layers 22b, the sealing portions 23, and the like in the membrane electrode assembly 14.

The organic compound in the embodiment 1 of the present invention is an organic compound forming the membrane electrode assembly 14, other than the proton conductive polymer. The organic compounds to be recovered in the embodiment 1 of the present invention include resins. Examples of such organic compounds include: resins contained in fluorine rubbers, silicon rubbers, olefin rubbers, diene rubbers, and the like; polyethylene naphthalate; polyethylene terephthalate; polyphenylene sulfide; polyethersulfone; polyetheretherketone; polyimide; polypropylne; polyimide; and polyvinylidene fluoride. Among them, from the viewpoint of being in common use, the recovery target is preferably polyvinylidene fluoride.

For recovering the organic compound, an aprotic solvent as a solvent is supplied to the gas flow channel 25.

Examples of aprotic solvents include acetone, cyclohexanone, 1-methyl-2-pyrrolidone, 1-ethyl-2-pyrrolidone, dimethylacetamide, and dimethylformamide. Among them, from the viewpoint of solubility, 1-methyl-2-pyrrolidone and dimethylformamide are preferred.

Specifically, as shown in FIG. 4, an aprotic solvent as a solvent is supplied to the gas flow channel 25. The amount, temperature, and time of circulation of the aprotic solvent supplied to the gas flow channel 25 are not limited, and may be appropriately selected according to the type, amount, and the like of the organic compound to be recovered.

The supplied aprotic solvent solution, which contains the organic compound dissolved in the aprotic solvent, may be supplied to a known process for purification and recovery of the organic compound.

Step of Recovering Fluororesin, Carbon, and Metal Other than Precious Metal by Heat Treatment Step S12 shown in FIG. 3 is a step of recovering a fluororesin, carbon, and a metal other than the precious metal from the fuel cell stack 100 after Step S11 by a heat treatment. In this step, the fuel cell stack 100 is subjected to a heat treatment to selectively recover the target materials.

Example of Recovery of Fluororesin

First, an example of a method of recovering a fluororesin will be described.

The fluororesin is recovered from the electrolyte membrane 11, the microporous layers 22b, and the like in the membrane electrode assembly 14.

The fluororesin to be recovered is not limited as long as it forms the membrane electrode assembly. From the viewpoint of being in common use, the recovery target is preferably a polytetrafluoroethylene. Polytetrafluoroethylenes include tetrafluoroethylene homopolymers and modified polytetrafluoroethylenes. A modified polytetrafluoroethylene refers to a copolymer that contains tetrafluoroethylene and a small amount of a modified monomer as monomer components and that is obtained by co-polymerizing the monomers. The modified monomer is not limited as long as it can be co-polymerized with tetrafluoroethylene, and examples include perfluoroolefins, chlorotrifluoroethylene, hydrofluoroolefins, and perfluorovinyl ethers.

Specifically, the fuel cell stack 100 after Step S11 is subjected to a heat treatment at a temperature of 300° C. or higher to thereby melt the fluororesin, obtaining a molten liquid. The molten liquid is subjected to a known purification step for the fluororesin and the fluororesin can thus be recovered. The upper limit of the heating temperature is not limited as long as it is a temperature generally used for baking in formation of the membrane electrode assembly 14 or the like. The upper limit of the heating temperature is, for example, 500° C.

Example of Recovery of Carbon

Next, an example of a method of recovering carbon will be described.

Carbon is recovered from the catalyst layer 21, the gas diffusion layer 22, and the like in the membrane electrode assembly 14. Note that carbon is recovered as a gaseous product, such as carbon dioxide or carbon monoxide.

Specifically, the fuel cell stack 100 after Step S11 is subjected to a heat treatment at a temperature of 600° C. or higher under an oxygen condition, thereby oxidizing the carbon to obtain a gaseous product containing carbon dioxide and carbon monoxide. The gaseous product can be collected by a known method taking advantage of the gaseous properties. The upper limit of the heating temperature is not limited, but, for example, is 900° C.

The method of recovering carbon dioxide and carbon monoxide from the gaseous product is not limited, and a known method may be used. Examples of methods of recovering carbon dioxide from the gaseous product include a method of separation using an absorber, a chemical absorption method in which a substance that is chemically reacted with carbon dioxide, such as an amine, is used to absorb carbon dioxide to recover carbon dioxide, and a physical absorption method in which carbon dioxide is separated using a physical dissolution phenomenon. An example of the method of recovering carbon monoxide from the gaseous product is a cryogenic separation method.

Example of Recovery of Metal Other than Precious Metal

Next, an example of a method of recovering a metal other than the precious metal will be described.

The metal other than the precious metal is recovered from the separators 15 and the like.

Examples of metals other than precious metals include copper (Cu), iron (Fe), aluminum (Al), chromium (Cr), lead (Pb), tin (Sn), cobalt (Co), zinc (Zn), magnesium (Mg), manganese (Mn), nickel (Ni), and titanium (Ti). Among them, from the viewpoint of being in common use, the recovery target is preferably iron, chromium, nickel, titanium, and the like.

The fuel cell stack 100 after Step S11 is subjected to a heat treatment at a temperature of 1000° C. or higher to thereby melt the metal other than the precious metal. The molten metal other than the precious metal can be recovered by subjecting the resultant to a known purification step. The upper limit of the heating temperature is not limited. The heat treatment may be performed under vacuum or in an inert gas atmosphere.

Since the method according to the embodiment 1 of the present invention as described above is a nondestructive method which requires no step of disassembling the fuel cell stack 100, an efficient process, such as an inline process, may be employed in the recovery facility.

Figure 5:
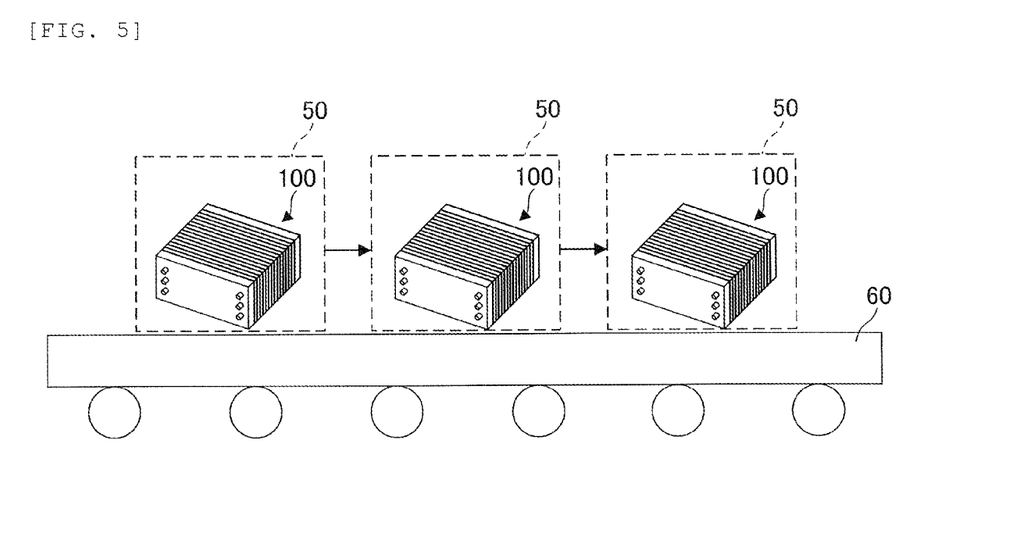
FIG. 5 is a diagram for explaining an example of a method of recovering materials forming a fuel cell stack in a recovery facility, according to the embodiment 1 of the present invention.

FIG. 5 is a diagram for explaining an example of a method of recovering materials forming a fuel cell stack in a recovery facility, according to the embodiment 1 of the present invention.

As shown in FIG. 5, for example, the fuel cell stack 100 housed in a chamber 50 is moved in one direction by a recovery process line 60. From the moving fuel cell stack 100, materials, such as a precious metal, a proton conductive polymer, and an organic compound, are recovered using the method of Step S11 and the like. The degree of completion of the recovery of the materials may be monitored in line using a known method. In this manner, by using the method according to the embodiment 1 of the present invention in a recovery facility, materials forming a fuel cell stack can be recovered in an efficient manner.

Preferred embodiments of the present invention are described above, but the present invention is not limited to the embodiments and various modifications and variations may be made within the scope of the gist thereof.

REFERENCE SIGNS LIST

100: Fuel cell stack,
2: Current collector
3: Insulating plate
4: End plate
5: Flow channel connector
10: Fuel cell
14: Membrane electrode assembly
15: Separator
11: Electrolyte membrane
12: Anode
13: Cathode
21: Catalyst layer
22: Gas diffusion layer
23: Sealing portion
25: Gas flow channel

The invention claimed is:

1. A method of recovering, from a fuel cell stack (100) having a stack structure including a plurality of fuel cells (10) stacked, materials forming the fuel cell stack (100),
the fuel cells (10) each including a membrane electrode assembly (14) and two separators (15) holding the membrane electrode assembly (14) therebetween, the separators (15) each being provided with a gas flow channel (25) configured to supply a raw material gas to the membrane electrode assembly (14),
the method comprising:
a first step of supplying an aprotic solvent to the fuel cell stack (100) through the gas flow channel (25), collecting the aprotic solvent which contains a material, and recovering the material from the collected solvent, wherein the first step includes:
supplying an oxidant and a reductant as reagents and an electrolytic solution as the aprotic solvent to the gas flow channel (25), collecting the electrolytic solution which contains a first portion of the material, and recovering the first portion of the material from the collected electrolytic solution; and supplying an alcohol solution as the solvent to the gas flow channel (25), collecting the alcohol solution which contains a second portion of the material, and recovering the second portion of the material from the collected alcohol solution; and a second step of subjecting the fuel cell stack (100) after the first step to a heat treatment to obtain a molten liquid and recovering a third portion of the material from the molten liquid, the materials recovered including materials forming the membrane electrode assembly (14) and the separators (15), the materials recovered further including an organic compound including a fluororesin forming the membrane electrode assembly (14).

2. The method of recovering materials forming the fuel cell stack (100) according to claim 1, wherein in the second step (S12), the fuel cell stack is subjected to a heat treatment at a temperature of 300° C. or higher to obtain a molten liquid, and the fluororesin is recovered from the molten liquid.

3. The method of recovering materials forming the fuel cell stack (100) according to claim 1, wherein the materials recovered include a precious metal forming the membrane electrode assembly (14) or the separators (15), a proton conductive polymer, or a metal other than the precious metal forming the separators (15).

4. The method of recovering materials forming a fuel cell stack (100) according to claim 3, wherein the proton conductive polymer comprises a perfluorosulfonic acid polymer, the organic compound comprises polyvinylidene fluoride, the fluororesin comprises a polytetrafluoroethylene, and the metal other than the precious metal comprises iron, chromium, nickel, or titanium.

5. The method of recovering materials forming the fuel cell stack (100) according to claim 3, wherein the first portion of the materials is the precious metal, and wherein the second portion of the materials is the proton conductive polymer.

6. The method of recovering materials forming a fuel cell stack (100) according to claim 5, wherein the oxidant is ozone, the reductant comprises hydrogen, carbon monoxide, sulfur dioxide, or a mixture thereof, and the precious metal comprises gold, silver, platinum, palladium, rhodium, iridium, ruthenium, or osmium.

7. The method of recovering materials forming a fuel cell stack (100) according to claim 6, wherein the first step (S11) further comprises a step of supplying an aprotic solvent as the solvent to the gas flow channel (25), collecting the aprotic solvent which contains the organic compound, and recovering the organic compound from the collected aprotic solvent.

8. The method of recovering materials forming a fuel cell stack (100) according to claim 7, wherein in the second step (S12), the fuel cell stack is subjected to a heat treatment at a temperature of 300° C. or higher to obtain a molten liquid, and the fluororesin or the metal other than the precious metal is recovered from the molten liquid.

9. The method of recovering materials forming a fuel cell stack (100) according to claim 8, wherein the proton conductive polymer comprises a perfluorosulfonic acid polymer, the organic compound comprises polyvinylidene fluoride, the fluororesin comprises a polytetrafluoroethylene, and the metal other than the precious metal comprises iron, chromium, nickel, or titanium.

\* \* \* \* \*